United States Patent Office 3,767,793
Patented Oct. 23, 1973

3,767,793
JUVENIMICIN AND PRODUCTION THEREOF
Motoo Shibata and Kazunori Hatano, Osaka, Eiji Higashide, Hyogo, Hideo Yamana, Osaka, and Toyokazu Kishi, Nara, Japan, assignors to Takeda Chemical Industries, Ltd., Osaka, Japan
Filed July 10, 1970, Ser. No. 53,736
Claims priority, application Japan, July 11, 1969, 44/55,201
Int. Cl. A61k 21/00
U.S. Cl. 424—122                    5 Claims

ABSTRACT OF THE DISCLOSURE

Novel Juvenimicin antibiotics are produced by culturing a Juvenimicin-producing microorganism belonging to the genus Micromonospora, e.g. *Micromonospora chalcea* var. *izumensis* (ATCC 21561), in a culture medium containing assimilable carbon source and digestible nitrogen source under aerobic conditions. The Juvenimicin is separated from the medium and may, if desired, be further separated into its active Juvenimicin components to a desired degree of purity.

---

This invention relates to novel antibiotics Juvenimicin and the production of the same.

It has been found by the present inventors that a group of new antibiotic substances are produced by microorganisms belonging to the genus Micromonospora and are accumulated in the culture broth; that the respective members of the new antibiotics are closely related to each other in their properties as well as in their chemical structures but they can be recovered from the culture broth in a desired degree of purity, separately into each member or as a mixture. The group of the new antibiotics has been collectively named as "Juvenimicin."

It has also been found that there exist, as the active ingredients of Juvenimicin, those antibiotics which have also been named as "Juvenimicin $A_1$" (formerly called by us "antibiotic T–1124–A"); "Juvenicicin $A_2$" (formerly "antibiotic T–1124–B"); "Juvenimicin $A_3$" (formerly "antibiotic T–1124–C"); "Juvenimicin $A_4$" (formerly "antibiotic T–1124–D"); "Juvenimicin $B_1$"; "Juvenimicin $B_2$"; "Juvenimicin $B_3$" and "Juvenimicin $B_4$." It is therefore to be noted that hereinafter, including also the claims, each of these active ingredients or a mixture of two or more of them is collectively referred to as simply "Juvenimicin" unless otherwise noted.

It is the principal object of the present invention to provide the new and useful Juvenimicin, collectively or separately into each member or a mixture of the members.

Another object is to provide the method for producing said useful antibiotics, "Juvenimicin," by means of microbial cultivation.

Further object is to provide the means for isolation of the product Juvenimicin, collectively or separately into each member or a mixture of the members.

These objects are realized by cultivating a Juvenimicin-producing microorganism of the genus Micromonospora in a suitable culture medium containing assimilable carbon source and digestible nitrogen source until Juvenimicin is substantially accumulated in the culture broth, and recovering the products therefrom.

For realizing said objects, those microorganisms belonging to the genus Micromonospora and capable of producing Juvenimicin are employed. These microorganisms include, for example, Strain No. T–1124 which has been isolated from a soil sample of Izumi district. Osaka, Japan. The microbiological characteristics of this strain are as follows:

(1) MORPHOLOGICAL CHARACTERISTICS

Vegetative mycelia develop well and are branching, but no septum is observed, their diameter ranging from 0.4 to 0.8 micron. Fair growth occurs on various media, but no aerial mycelium is formed. A single spore is formed at the tip of the spore bearing hyphae branching from the vegetative mycelium. The spore bearing hyphae are usually 1 to 2 microns in length, but occasionally 3 to 6 microns long. Many spores are formed, and each spore is spherical to oval or ellipsoidal, from 0.5 to 1 micron by 0.5 to 1.3 microns, with smooth surface.

(2) CULTURAL CHARACTERISTICS

The growth is slower than that of Streptomyces in general. The vegetative mycelia are colorless in an early stage of the growth, but color orange yellow to orange brown later. On some media, it exhibits a black, moistened glossy growth.

On almost all media, no soluble pigment is produced. The pH for growth ranges from 5 to 9, optimally about neutral. The temperature for growth is about 20° to 45° C., the optimal being 30° to 37° C.

In the following description, the color names designated "Rdg." are based on Ridgeway's "Color Standard and Nomenclature," and the observations are on cultivations at 28° C. for 14 days unless otherwise noted. The abbreviations "G," "R" and "SP" mean "growth," "reverse" and "soluble pigment," respectively.

(a) Czapek's agar:
  G.: Moderate, Pinkish Buff (Rdg. XXIX, 17″-d) to Dark Olive (Rdg. XL, 21‴-m).
  R.: Dark Olive (Rdg. XL, 21‴-m).

(b) Czapek's solution:
  G.: Moderate, sinks to the bottom, colorless with Seashell Pink (Rdg. XIV, 11′-f) tinge.
  SP: None.

(c) Glucose Czapek's agar:
  G.: Poor, Wood Brown (Rdg. XL, 17‴).
  R.: Colorless to Vinaceous-Fawn (Rdg. XL, 13‴-b).
  SP: None.

(d) Glycerin Czapek's agar:
  G.: Scant, colorless to Vinaceous Buff (Rdg. XL, 17‴-d).
  R.: Colorless.
  SP: None.

(e) Glucose asparagine agar:
  G.: Moderate, Cinnamon Buff (Rdg. XXIX, 17″-b). to Olive-Brown (Rdg. XL, 17‴-k).
  R.: Deep Olive (Rdg. XL, 21‴-k) to black.
  SP: None.

(f) Nutrient agar:
  G.: Poor, colorless to Pinkish Buff (Rdg. XXIX, 17″-d).
  R.: Colorless.
  SP: None.

(g) Glucose nutrient agar:
  G.: Moderate, wrinkled, Pinkish Buff (Rdg. XXIX, 17″-d) to Tawny Olive (Rdg. XXIX, 17″-i).
  R.: Colorless.
  SP: None.

(h) Glycerin nutrient agar:
  G.: Scant, colorless to Pinkish Buff (Rdg. XXIX, 17″-d).
  R.: Colorless.
  SP: None.

(i) Starch agar:
  G.: Moderate, penetrating into the medium, colorless to Tawny Olive (Rdg. XXIX, 17″-i) or Brownish Olive (Rdg. XXX, 19″-m) with black patches.
  R.: Pale Pinkish Buff (Rdg. XXIX, 17″-f).
  SP.: None.

(j) Plane agar:
   G.: None or very scant, colorless.
   SP: None.
(k) Yeast extract agar:
   G.: Abundant, lichenoid, wrinkled, Snuff Brown (Rdg. XXIX, 15''-k) to Bister (Rdg. XXIX, 15''-m) or black.
   R.: Sayal Brown (Rdg. XXIX, 15''-i).
   SP: None, one month later sometimes faint brown.
(l) Potato plug:
   G.: Abundant, lichenoid, wrinkled, Zinc Orange (Rdg. XV, 13') to Snuff Brown (Rdg. XXIX, 15''-k).
   SP: Faint gray to dark grayish brown.
(m) Carrot plug:
   G.: Scant, Zinc Orange (Rdg. XV, 13').
   SP: None.
(n) Cellulose:
   G.: Moderate, Roman Green (Rdg. XVI, 23'-m), later turns to grayish black.
   The paper strip remains undecomposed.
(o) Calcium malate agar:
   G.: Very poor, Dark Olive-Buff (Rdg. XL, 21'''), later Deep Olive (Rdg. XL, 21'''-k).
   R.: Colorless.
   SP: None.
(p) Tyrosine agar:
   G.: Very poor, colorless, later Oliver Buff (Rdg. XL, 21'''-d).
   R.: Colorless.
   SP: None.
(q) Peptone agar:
   G.: Poor, Clay Color (Rdg. XXIX, 17'') to Saccardo's Umber (Rdg. XXIX, 17''-k), later Deep Olive (Rdg. XL, 21'''-k).
   R.: Colorless.
   SP: None.
(r) Starch hydrolysis: Enzyme zone/growth zone: 27 to 32 millimeters/9 to 10 millimeters.
(s) Litmus milk: G.: Ring form on the tube, orange, coagulation and peptonization. The pH changes to 6.0-6.1.
(t) Löffler's medium (at 37 C.): G.: Moderate, Zinc Orange (Rdg. XV, 13'), liquefaction.
(u) Gelatin stab (at 24° C. for one month): G.: None.
(v) Nitrate reduction: Negative.
(w) Chitin: Decomposed.
(x) Spores resist 80° C. for 1 to 5 minutes.

The cultural behaviors at 37° C. are similar to those described above, except that the growth occurs more luxuriantly and the colors are generally darker or blackened.

(3) UTILIZATION OF CARBON SOURCES

Observations according to the method of Pridham and Gottlieb (Journal of Bacteriology, vol. 59, p. 107 (1948)) are shown in Table 1.

TABLE 1

| Carbon source | Temperature of cultivation 28° C. | Temperature of cultivation 37° C. | Carbon source | Temperature of cultivation 28° C. | Temperature of cultivation 37° C. |
|---|---|---|---|---|---|
| Erythritol | − | − | Melibiose | ++ | ++ |
| Adonitol | − | − | Maltose | +++ | ++ |
| D-sorbitol | − | − | Sucrose | ++ | ++ |
| Inositol | − | − | Lactose | ++ | + to ++ |
| D-mannitol | − | − | Raffinose | +to++ | + |
| Dulcitol | − | − | Trehalose | ++ | ++ |
| D-xylose | +++ | +++ | Salicin | ++ | ++ |
| L-arabinose | − | − | Esculin | − | − |
| L-sorbose | − | − | Inulin | − | ±to+ |
| D-galactose | +++ | +++ | Starch | +++ | +++ |
| D-glucose | +++ | +++ | Na acetate | ++ | +to++ |
| D-fructose | + | + | Glycerin | − | − |
| D-mannose | − | − | Control | − | − |
| Rhamnose | − | | | | |

NOTE.—+++=Abundant growth. ++=Good growth. +=Fair growth. ±=Faint growth. −=No growth.

The antibiotics produced by Strain No. T-1124 are of the so-called macrolide antibiotics, but the only Micromonospora strains that are previously known to produce a macrolide antibiotic are Micromonospora W-847, which has been described as being capable of producing Megalomicins in Dutch patent application No. 6807363 and in The Journal of Antibiotics, vol. 22 (No. 6) p. 253 et seq. (1969). These known strains of the genus Micromonospora grow only poorly on glucose asparagine agar and Bennet's agar, produce a brown soluble pigment on tyrosine agar and are substantially incapable of growing on the media containing cellulose, galactose or raffinose as the sole source of carbon; in contrast thereto, Strain No. T-1124 gives good growth on the above-mentioned media, without pigment production. Thus, the latter strain is dissimilar to the known strains, Micromonospora W-847.

With regard to the microbiological characteristics of Strain No. T-1124, reference to "Bergey's Manual of Determinative Bacteriology," 7th edition (published by The Williams & Wilkins Co. in 1957), S. A. Waksman's "Actinomycetes," vol. 2 (published by The Williams & Wilkins Co. in 1961) etc. suggests that Strain No. T-1124 relates to Micromonospora chalcea. Thus, the strain is aerobic and its spore bearing hyphae are comparatively long and not much branched. In addition, the strain does not form aerial mycelium. In these aspects, it bears resemblance to Micromonospora chalcea. The strain also resembles Micromonospora chalcea in that it coagulates and peptonize milk, hydrolyzes starch, decomposes chitin and inverts sucrose.

However, while Micromonospora chalcea reduces nitrates, liquefies gelatin and rapidly decomposes cellulose, Strain No. T-1124 does not reduce nitrates, does not grow on gelatin, and does not decompose cellulose though it grows thereon. In light of the foregoing observations, Strain No. T-1124 has been designated as Micromonospora chalcea var. izumensis, i.e. as a varient of Micromonospora chalcea.

Strain No. T-1124 has been deposited at Institute for Fermentation, Osaka, Osaka, Japan under the accession number of IFO-12988 and at American Type Culture Collection under the accession number ATCC 21561.

Like those of other actinomycetes such as Streptomyces, the characteristics of the Micromonospora strains are in general susceptible to mutations, regardless of whether the mutation is caused spontaneously or artificially, for example, with X-ray, ultraviolet ray, or by the action of chemical mutagenic compounds such as nitrogen mustard, nitrosoguanidine or salts of heavy metals. Among those mutants as well as their wild type strains, any one can be employed in the method of the present invention as long as it produces Juvenimicin-producing organism belonging to the genus Micromonospora is cultivated in a medium containing assimilable carbon sources, digestable nitrogen sources and other nutrients. The culture medium can be liquid or solid, but the liquid medium is more convenient and a submerged culture using aerated agitation is most advantageous.

In the medium are incorporated assimilable carbon sources for the Juvenimicin-producing organism to be employed, such as glucose, soluble starch, sucrose, dextrin or the like, and digestible nitrogen sources for that organism, such as cornsteep liquor, polypepton, raw soybean meal, cotton seed meal or the like as well as inorganic salts which are conventionally used for cultivating microorganisms. Particular heavy metal salts such as ferrous sulfate and magnesium sulfate or a deforming agent may be supplemented as occasion demands.

The culture conditions such as temperature, culture period and pH of the medium are determined so that the microorganism being used grows and the output of the antibiotics are maximum. By way of example, when Micromonospora chalcea var. izumensis is used, the culture period is advantageously from 2 to 7 days. The medium is preferably maintained at a pH between about 5 and 8, and the incubating temperature lies between about 20° and 45° C., and, for better reuslts, between 27° and 34° C.

The fermentation broth obtained as above contains the components of Juvenimicin. To isolate this group of antibiotics from the fermentation broth, use may be made of respective means which have heretofore been employed in recovering the metabolites of a microorganism from its fermentation broth. Thus, by taking advantage of the fact that this class of antibotics are basic, fat-soluble substances, they may be separated by technique utilizing those properties.

Since those antibiotics are accumulated predominantly in the liquid phase of the fermentation broth, the broth may be filtered first and the active ingredients may then be extracted with a water-immiscible organic solvent from the filtered broth or filtrate. By way of example, the fermentation broth is stirred well at pH 7 to 10 in the presence of about 3 to 5% by weight of diatomaceous earth as a filter-aid, then is filtered. The resulting filtrate is extracted with an organic solvent which is immiscible or not completely miscible with water, such as a lower fatty acid ester (e.g. ethyl acetate or amyl acetate), an aromatic hydrocarbon (e.g. benzene or toluene), a chlorinated hydrocarbon (e.g. methylene chloride or chloroform), a ketone (e.g. methyl isobutyl ketone, or methyl ethyl ketone), an alcohol (e.g. n-butanol or isoamyl alcohol) or a mixture of two or more of them.

The active ingredients may be adsorbed on an adsorbent such as activated carbon, white carbon (colloidal silica; commercially available e.g. under a trade name of "Amberlite XAD"), a weakly acid cation exchange resin (e.g. "Amberlite IRC-50"), a strongly acid cation exchange resin (e.g. "Amberlite IR-120" or "Dowex 50") or the like, and, then, eluted with a suitable solvent.

The extract thus obtained is further extracted with an acidic aqueous solution, such as a buffer solution of a pH of about 2 to 6 or a dilute mineral acid solution of pH 3 to 6, whereup the active ingredients are brought into the aqueous phase. This aqueous solution is separated and then adjusted to pH 7 to 10 by the addition of an alkali, whereby the active ingredients can be again transferred into a water immiscible or not completely miscible organic solvent phase newly added. The organic solvent layer is separated, washed with water, dehydrated and concentrated in vacuo. The procedure yields a powdery preparation of the antibiotic Juvenimicin.

From this powdery Juvenimicin, there can be separated the desired respective antibiotics by means of such technics as adsorption chromatography, gel filtration, ion exchange adsorption, etc., whether used singly or in combination.

As the adsorbent, such materials as silica gel, alumina, activated carbon, "Amberlite XAD" (see supra) and the like may be employed. For gel filtration, "Sephadex LH–20" (trade name for dextran particles sold by Pharmacia Co., Sweden), and as the ion exchange resin, "Amberlite IRC–50," "Amberlite IR–120" and "Dowex 50" (see above) may be employed. Regarding the solvent for use as an eluant where the adsorbent is silca gel, it is desirable to employ a mixture of a low-polar solvent (e.g. chloroform or ethyl acetate) and a polar solvent (e.g. methanol or aqueous ammonia). Where the adsorbent is activated carbon, such eluants as aqueous methanol, aqueous acetone, methanol, acetone, ethyl acetate, chloroform or the like may prove of use. Ethanol is particularly recommended where the adsorbent is Sephadex LH–20.

As mentioned above, the instant antibiotic consists of several components. This is readily confirmed by subjecting the antibiotic mixture to thin layer chromatography on silica gel, e.g. "Spotfilm f" manufactured by Tokyo Kasei K.K., Japan, with a mixture developer consisting of chloroform, methanol and a 7% aqueous ammonia solution (40:12:20 by volume), giving distinct spots on the chromatogram. The components are broadly classified into two series, i.e. Juvenimicin A and Juvenimicin B, and the respective series include several ingredients. All the components are designated as $A_1$, $A_2$, $A_3$, $A_4$, $B_1$, $B_2$, $B_3$, and $B_4$ in the order of decreasing $R_f$ values on said thin layer chromatography. The $R_f$ values are as follows:

Juvenimicin A $A_1$ ---------------------------------------- $0.85 \pm 0.05$
$A_2$ ---------------------------------------- $0.80 \pm 0.05$
$A_3$ ---------------------------------------- $0.70 \pm 0.05$
$A_4$ ---------------------------------------- $0.65 \pm 0.05$ Juvenimicin B $B_1$ ---------------------------------------- $0.50 \pm 0.05$
$B_2$ ---------------------------------------- $0.40 \pm 0.05$
$B_3$ ---------------------------------------- $0.33 \pm 0.05$
$B_4$ ---------------------------------------- $0.25 \pm 0.05$ The characteristic properties of the respective series (Juvenimicin A and Juvenimicin B) as well as the major specific ingredients are detailed as follows:

Juvenimicin A (as obtained in Example 1)

(1) Elementary analysis: C: $63.39 \pm 1.0$; H: $8.83 \pm 0.5$; N: $2.80 \pm 0.5$ (2) Specific rotation: $[\alpha]_D^{24} = -13.4° \pm 10°$ (c.=0.5% in $CHCl_3$)

(3) Molecular weight:

(a) Vapour osmosis pressure method: $655 \pm 70$ (in $C_6H_6$)

(b) Highest mass number: m/e=581

(4) Color reaction:

(a) Erythromycin test: negative
(b) Carbomycin test: negative
(c) Dragendorff reaction: positive (5) Solubilities: Soluble in benzene, chloroform, ethyl acetate, dimethylformamide, ethanol or anaqueous acid solution; insoluble in petroleum ether, n-hexane or a neutral water.

Figure 5:
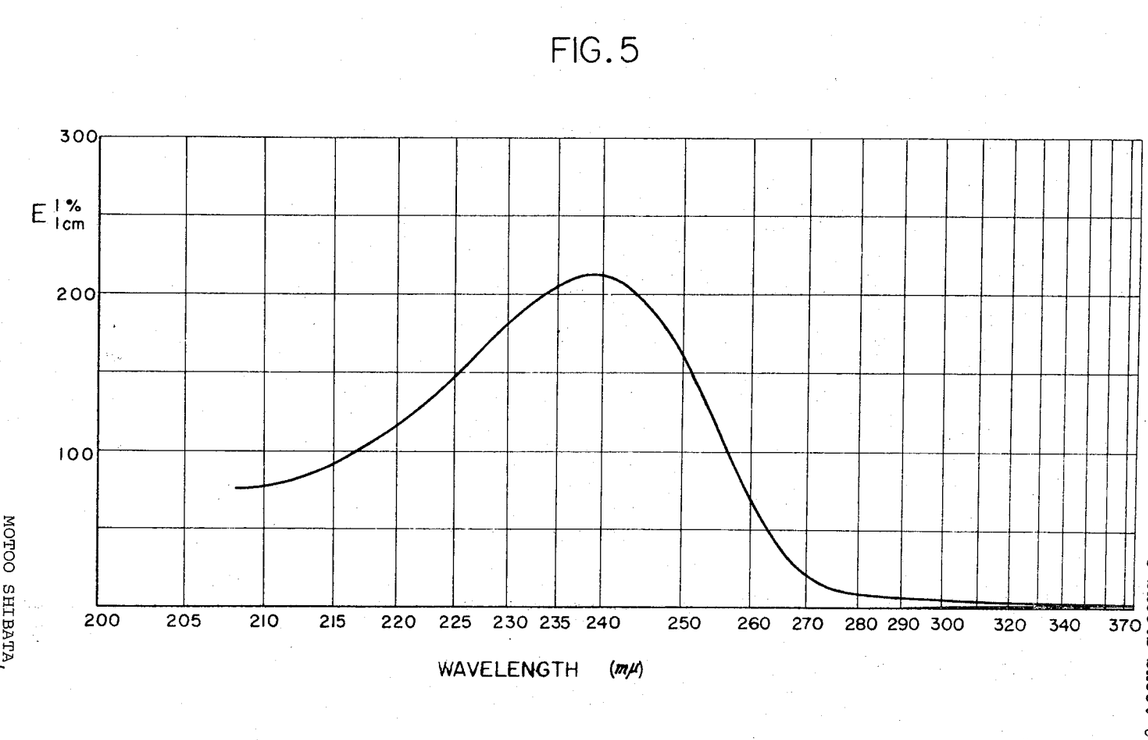

(6) Ultraviolet absorption: As shown in FIG. 5.

$$\lambda_{max.}^{EtOH} = 240 \pm 2 \, m\mu \, (E_{1\,cm.}^{1\%} = 230 \pm 30)$$

Figure 1:
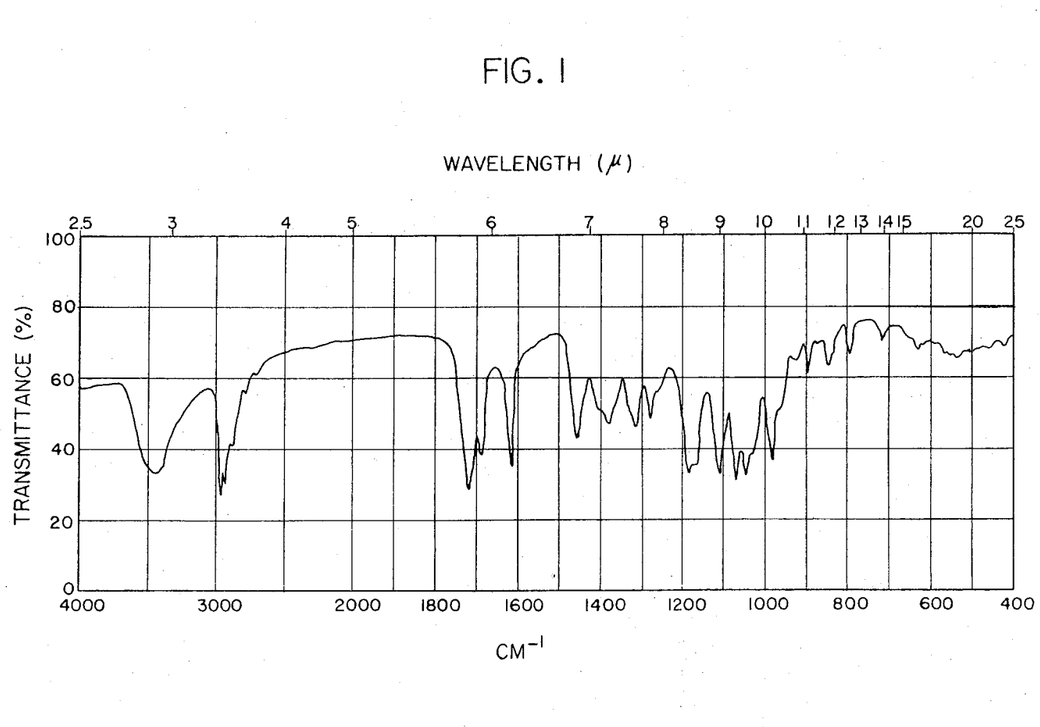

(7) Infrared absorption:

As shown in FIG. 1, and the main absorption bands in wave numbers (cm.$^{-1}$) are as follows: 3450 (s.), 2960 (s.), 1725 (s.), 1695 (m.), 1625 (s.), 1458 (m.), 1383 (m.), 1314 (m.), 1276 (m.), 1250 (m.), 1180 (s.), 1167 (s.), 1111 (s.), 1072 (s.), 1047 (s.), 1027 (m.), 983 (s.), 966 (sh.), 932 (w.), 896 (m.), 869 (w.), 846 (w.), 834 (w.), 792 (m.), 755 (w.), 713 (w.).

Remark: In the brackets, "vs.," "s.," "m.," "w." and "sh." mean "very strong," "strong," "medium," "weak" and "shoulder," respectively, and the same also applies to the description below on infrared spectra.

(8) Acute toxicity in mice ($LD_{50}$):

Intravenous injection: 100 to 200 mg./kg.
Intraperitoneal injection: 200 to 400 mg./kg.
Oral administration: >1,000 mg./kg.

(9) Effective Dose ($ED_{50}$): Observed on 4-week old mice infected with Staphylococcus aureus by subcutaneous injection: $ED_{50} = 7.1$ mg/kg.

Juvenimicin $A_3$ (as obtained in Example 3)

(1) Elementary analysis: C: $62.97 \pm 1.0$; H: $8.62 \pm 0.5$; N: $3.00 \pm 0.5$.

(2) Specific rotation: $[\alpha]_D^{24} = -17.6° \pm 10°$ (c.=0.29% in $CHCl_3$).

(3) Molecular weight:

(a) Vapour pressure osmosis method: 541±60 (in $C_6H_6$)
(b) Titration method: 562±60
(c) Highest mass number: m/e=581

(4) $pK_{a'}$:

$pK_{a'}$=8.4 (in 66% dimethylformamide (5) Color reaction: The same as Juvenimicin A.
(6) Solubilities: The same as Juvenimicin A.
(7) $R_f$-values on paper chromatography: paper: Toyoroshi No. 51; developed with:

(a) 0.05 N aqueous ammonia solution saturated with methyl isobutyl ketone ______ 0.74±0.1
(b) Mixture of methyl isobutyl ketone and methyl ethyl ketone (4:1) __________ 0.68±0.1
(c) Methyl isobutyl ketone ____________ 0.57±0.1
(d) M/15 phosphate buffer saturated with n-butyl acetate (pH=8.0) (the paper is impregnated with 2% liquid paraffine) _____ 0.60±0.1
(e) Mixture of benzene and cyclohexane (1:1), saturated with formamide (the paper is impregnated with a mixture of formamide and methanol (1:1) _______________ 0.02±0.02
(f) 0.05 N aqueous ammonia solution saturated with n-butyl ethyl ketone _________ 0.7±0.1

(8) $R_f$-values on thin layer chromatography:

(a)

Adsorbent: silica gel ("Chromatospot," Tokyo Kasei K.K.)
Eluant: Mixture of chloroform, methanol and 7% aqueous ammonia solution (40:12:20)—0.7±0.05

(b)

Adsorbent: alumina (Merck & Co.)
Eluant: Ether—0.49±0.05
Under the same conditions, the respective $R_f$-values of other components were as follows:

$A_1$ ------------------------------------ 0.72±0.05
$A_2$ ------------------------------------ 0.72±0.05
$A_4$ ------------------------------------ 0.07±0.05

(c)

Adsorbent: alumina (Merck & Co.)
Eluant: mixture of benzene and acetone (4:1)—0.65±0.05
Under the same conditions, the respective $R_f$-values of other components were as follows:

$A_1$ ------------------------------------ 0.80±0.05
$A_2$ ------------------------------------ 0.80±0.05
$A_4$ ------------------------------------ 0.29±0.05

(9) Ultraviolet absorption: The same as Juvenimicin A.

Figure 2:
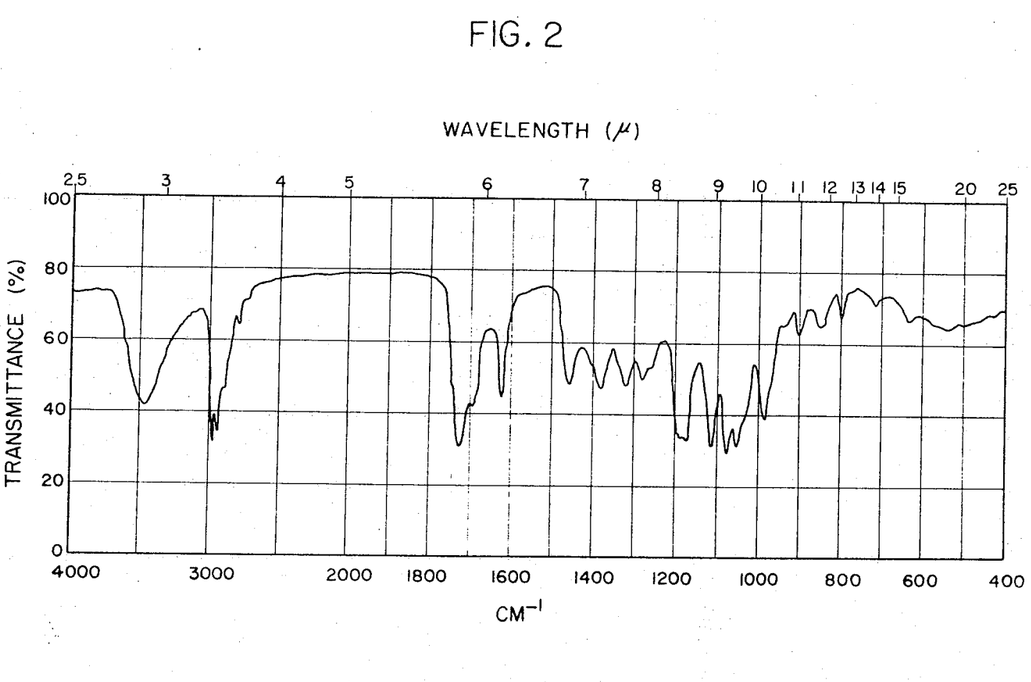

(10) Infrared absorption spectrum:

As shown in FIG. 2, and the main absorption bands in wave number (cm.$^{-1}$) are as follows: 3450 (s.), 2960 (s.), 1725 (s.), 1695 (m.), 1625 (s.), 1458 (m.), 1383 (m.), 1314 (m.), 1276 (m.), 1250 (w.), 1180 (s.), 1167 (s.), 1111 (s.), 1072 (s.), 1047 (s.), 1027 (m.), 983 (s.), 966 (sh.), 932 (w.), 896 (m.), 869 (w.), 846 (w.), 834 (w.), 792 (m.), 755 (w.), 713 (w.).

Juvenimicin $B_1$ (as obtained in Example 6)

(1) Elementary analysis: C: 64.0±1.0; H: 9.4±0.5; N: 2.5±0.5
(2) Specific rotation:

$[\alpha]_D^{23}$= −3.0°±5° (c.=0.5% in methanol)
$[\alpha]_D^{23}$=+7.6°±5° (c.=0.5% in $CHCl_3$)

Figure 6:
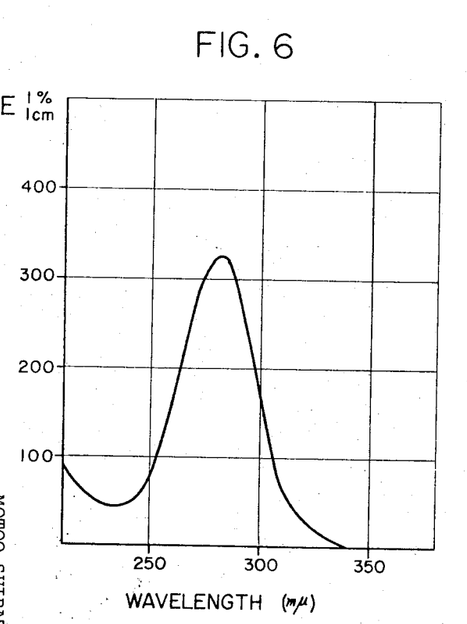

(3) Mass spectrometry: Highest mass number: m/e=567
(4) Color reaction:

(a) Erythromycin test: negative
(b) Carbomycin test: negative
(c) Dragendorff reaction: positive (5) Solubilities: The same as Juvenimicin A.
(6) Ultraviolet absorption: As shown in FIG. 6.

$\lambda_{max.}^{EtOH}$=283±2 m$\mu$ ($E_{1cm.}^{1\%}$=326±30)

Figure 3:
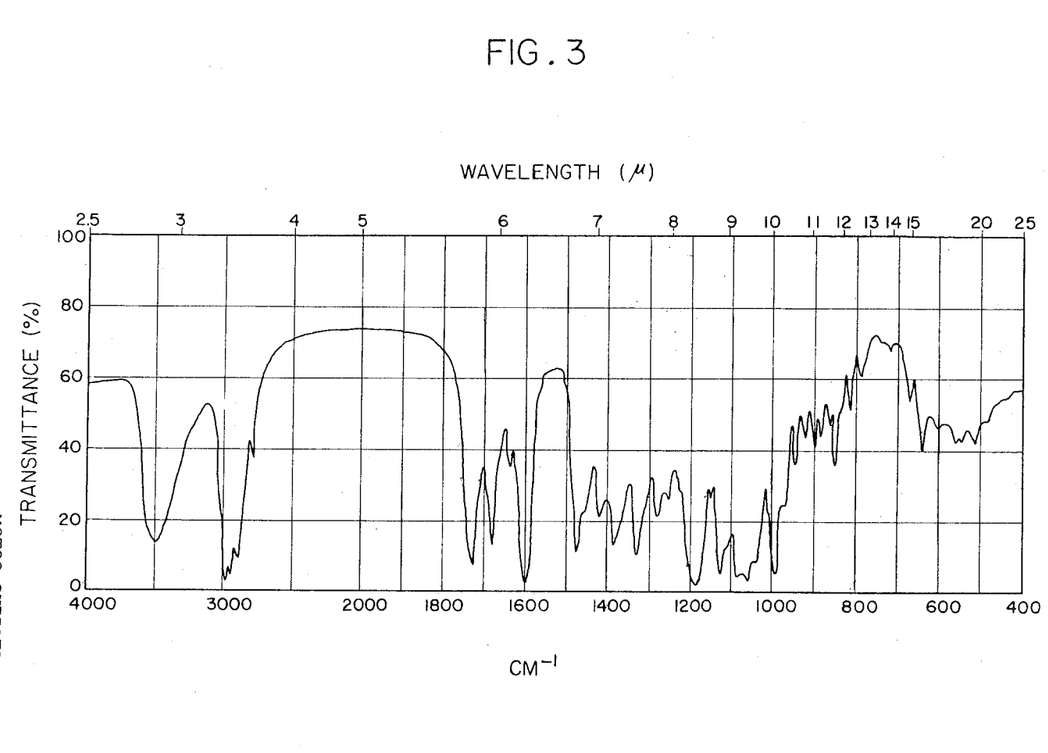

(7) Infrared absorption spectrum:

As shown in FIG. 3, measured in KBr disc, and the main absorption bands in wave number (cm.$^{-1}$) are as follows: 3450 (v.s.), 2940 (v.s.), 1715 (s.), 1670 (s.), 1595 (v.s.), 1455 (m.), 1380 (m.), 1312 (s.), 1272 (m.), 1175 (v.s.), 1110 (s.), 1065 (v.s.), 1050 (v.s.), 1024 (sh.), 985 (v.s.), 928 (w.), 905 (w.), 889 (w.), 843 (w.), 805 (w.).

(8) Acute toxicity ($LD_{50}$) in mice: Intraperitoneal injection: 125 to 250 mg./kg.
(9) Effective dose: Observed on 4-week old mice infected with Staphylococcus aureus:

Subcutaneous injection: $ED_{50}$=5.81 mg./kg.
Oral administration: $ED_{50}$=81.2 mg./kg.

Juvenimicin $B_3$ (as obtained in Example 6)

(1) Elementary analysis: C: 64.7±1.0; H: 10.2±0.5; N: 3.6±0.5
(2) Specific rotation:

$[\alpha]_D^{23}$= −9.0°±5° (c.=0.5% in methanol)
$[\alpha]_D^{23}$=+5.6°±5° (c.=0.5% in $CHCl_3$)

Figure 7:
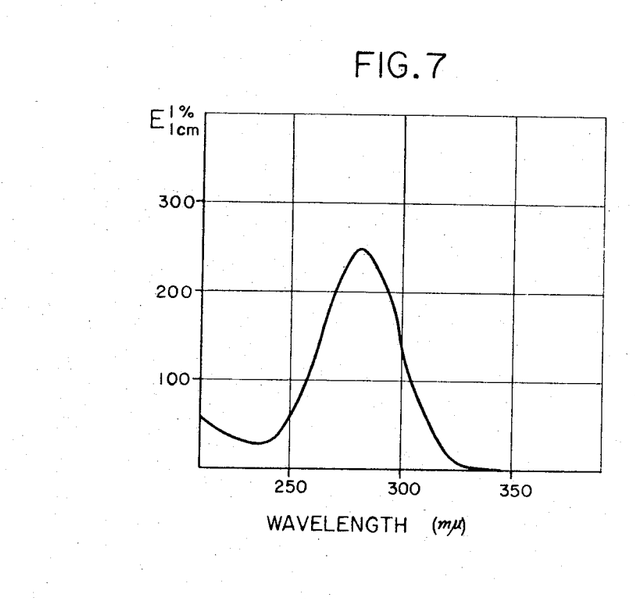

(3) Mass spectrometry: Highest mass number: m/e=583
(4) Color reaction: The same as Juvenimicin $B_1$
(5) Solubilities: The same as Juvenimicin $B_1$
(6) Ultraviolet absorption: As shown in FIG. 7.

$\lambda_{max.}^{EtOH}$=283±2 m$\mu$ ($E_{1cm.}^{1\%}$=248±25)

Figure 4:
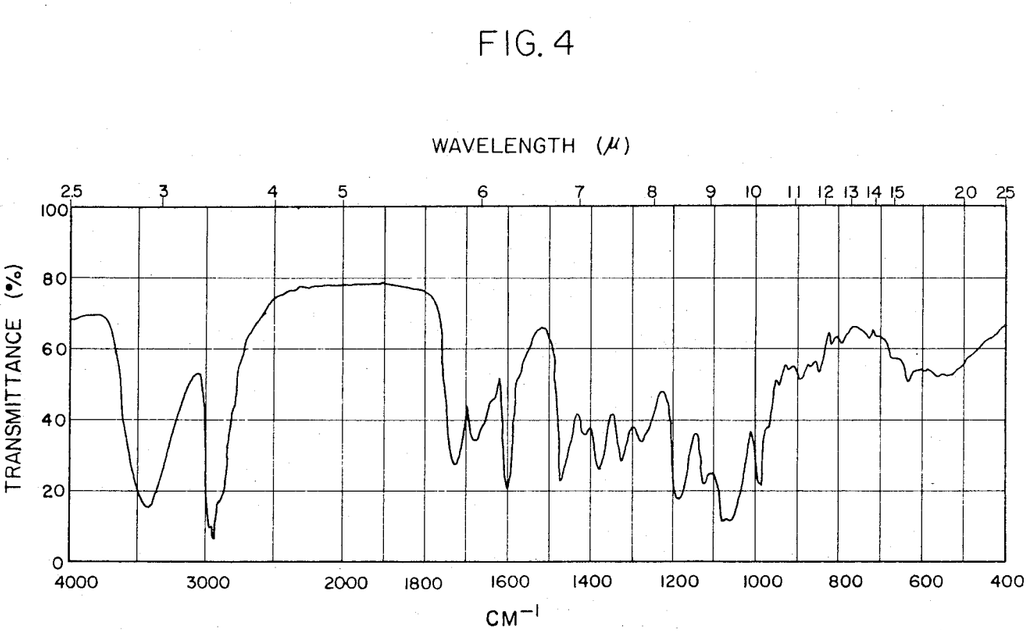

(7) Infrared absorption spectrum:

As shown in FIG. 4, measured in KBr disc, and the main absorption bands in wave number (cm.$^{-1}$) are as follows: 3450 (v.s.), 2940 (v.s.), 1720 (m.), 1670 (m.), 1595 (s.), 1455 (s.), 1380 (s.), 1312 (s.), 1275 (m.), 1170 (s.), 1110 (s.), 1070 (v.s.), 1045 (v.s.), 985 (s.), 935 (w.), 905 (w.), 887 (w.), 840 (w.), 808 (w.).

(8) Acute toxicity ($LD_{50}$) in mice: Intraperitoneal injection: 250 to 500 mg./kg.
(9) Effective dose: Observed on 4-week old mice infected with Staphylococcus aureus by subcutaneous injection: $ED_{50}$=5.0 mg./kg.

The present antibiotics, Juvenimicin, will now be compared with the hitherto-known antibiotics.

Among the antibiotics produced by Micromonospora, the macrolide antibiotics that are known are solely Megalomicins A, B, $C_1$ and $C_2$, which are produced by Micromonospora sp. W-847 (NRRL-3274) (see Dutch patent application No. 6807363). Juveniminicin differentiates itself markedly in elementary analysis, infrared absorption and specific rotation from Megalomicins which are larger in molecular size than Juveniminicin, and which contain two nitrogen atoms per molecule while Juvenimicin contains only one nitrogen per molecule.

Among the known macrolide antibiotics, those which give the maximum UV-absorption at 240 millimicrons are Cirramycin A ($A_1$ to $A_5$) and R-491-A, though these are all produced by the organisms belonging to the genus Streptomyces. However, Juvenimicin A clearly differs from Cirramycin $A_1$ (Koshiyama et al., Journal of Antibiotics, Japan, (A), Vol. 22, p. 61 (1969)) in solubilities, molecular weight, infrared absorption, Erythromycin test, Carbomycin test, etc., and also from Cirramycins $A_2$, $A_3$, $A_4$ and $A_5$ in $R_f$-values of paper chromatography. The antibiotic R-491-A (Ishida et al., Report in Tohoku Branch Assembly, The Pharmaceutical Society of Japan, held in December 1964) is markedly different from Juvenimicin A in infrared absorption.

It is concluded from the foregoing observation that Juvenimicin A and its respective components $A_1$, $A_2$, $A_3$ and $A_4$ are novel antibiotics.

Juvenimicins $B_1$ and $B_3$ are characteristic in having a strong infrared absroptio nat 1720 cm.$^{-1}$, affirming that they are macrolide antibiotics, and also in showing the maximum ultraviolet absorption in the neighborhood millimicrons. Among the known macrolide antibiotics, those which have the maximum UV-absorption near 280 millimicrons are Carbomycin B (F. A. Hochstein et al., The Journal of American Chemical Society, vol. 76, p. 5080 (1954)): Niddamycin (G. Huber et al., Arzneimittelforschung vol. 12, p. 1191 (1962)); Relomycin (H. A. Whaley et al., Antimicrobial Agents and Chemotherapy 1963, p. 45); Tylosin (J. M. McGuire et al., Antibiotics and Chemotherapy, vol. 11, p. 320 (1961)); Antibiotic PA-108 (K. Murai et al., ibid. vol. 9, p. 485 (1959)); Macrocin (R. L. Hamill et al., Journal of Antibiotics (A), vol. 17, p. 133 (1964)); Abbott—29119 (P. P. Hung et al., Applied Microbiology, vol. 13, p. 216 (1965)) and Antibiotic M-188 (Japanese patent publication No. 2,994/1964). However, Juvenimicins $B_1$ and $B_3$ are clearly different from those known macrolide antibiotics in specific rotation, infrared absorption, elementary analysis, etc., and are therefore concluded to be novel.

Antimicrobial spectra are shown in Table 2.

For the measurement of the minimum inhibitory concentration (MIC), common bacteria as the test organisms were cultured on bouillon agar at 37° C. for 18 hours. Acid fast bacteria were cultivated on glycerin bouillon agar at 37° C. for 40 hours. In case of the phytotoxic bacteria, glucose bouillon agar was used as assay medium.

TABLE 2

[MIC in micrograms/milliliter]

| Test organisms | A | $A_3$ | $B_1$ | $B_3$ |
| --- | --- | --- | --- | --- |
| Escherichia coli | 10 | 5 | 100 | >100 |
| Proteus vulgaris | 20 | 10 | 100 | 100 |
| Pseudomonas aeruginosa | 100 | 100 | >100 | >100 |
| Staphylococcus aureus | 0.5 | 0.5 | 10 | 10 |
| Staphylococcus aureus (Oleandomycin, erythromycin resistant strain) | >100 | >100 | >100 | >100 |
| Bacillus subtilis | 0.1 | 0.1 | 1 | 10 |
| Bacillus cereus | 0.1–0.2 | 0.1 | 5 | 10 |
| Bacillus brevis | 0.5 | 0.2 | 10 | 50 |
| Sarcina lutea | 0.05 | 0.05 | 0.5 | 0.5 |
| Micrococcus flavus | 0.05 | 0.05 | 0.5 | 0.5 |
| Mycobacterium avium | >100 | >100 | >100 | >100 |
| Mycobacterium avium (Streptomycin resistant) | >100 | >100 | >100 | >100 |
| Mycobacterium avium (Neomycin resistant) | >100 | >100 | >100 | >100 |
| Mycobacterium sp. 607 | >100 | >100 | >100 | >100 |
| Mycobacterium phlei | 50 | 100 | 100 | >100 |
| Mycobacterium smegmatis | 50 | 100 | 100 | >100 |
| Xanthomonas oryzae | <1.0 | <1.0 | | |

Staphylococci are pyogenic or pus-forming bacteria. They tend to produce circumscribed lesions, e.g. in the form of abscesses and the like, which often occur in the skin. Staphylococci are the cause of furuncles and of carbuncles and other common wound infections. The new products of the present invention are useful in topical preparations for the treatment of this type of infection in mammals (dogs, cats, humans, etc.). Thus, a useful preparation for topical application to an infection due to *Staphylococcus aureus* is as follows:

Into 1 gram of wool fat is uniformly incorporated one of the following itemized components: (1) 20 mg. of Juvenimicin A, (2) 20 mg. of Juvenimicin $A_1$, (3) 50 mg. of Juvenimicin $B_1$, or (4) 50 mg. of Juvenimicin $B_3$, and the mixture is then admixed uniformly with sufficient while petrolatum to make 10 grams of ointment.

This is topically applied in amount sufficient to cover the wound being treated, with gentle rubbing in, the application being made at least once daily and being repeated several times daily, if necessary or desired.

Due to the disclosed bactericidal and bacteriostatic properties of the new products of the invention, they are useful e.g. to disinfect hospital apparatus, etc. which are generally exposed to pathogenic Gram-positive or negative bacteria of the type which are sensitive to such products, as aforementioned. Disinfection is effected by application or spraying of a solution (e.g. methanolic or ethanolic, etc.) containing one of the following itemized components: (1) 20 mcg./ml. of Juvenimicin A; (2) 20 mcg./ml. of Juvenimicin $A_3$, (3) 50 mcg./ml. of Juvenimicin $B_1$ or (4) 50 mcg./ml. of Juvenimicin $B_3$.

For better understanding of the invention the following examples are given. In these examples as well as the foregoing, the abbreviations "mcg.," "mg.," "g.," "kg.," "$\mu$," "cm.," "ml.," "l.," and "$\gamma$" mean "microgram(s)" "milligram(s)," "gram(s)," "kilogram(s)," "micron(s)," "centimeter(s)," "milliliter(s)," "liter(s)" and "gamma(s)," respectively. As for the compossition of the culture media, percentages are on weight per volume basis, i.e. grams per 100 milliliters. All percentages in other respects are on the weight basis unless otherwise noted.

EXAMPLE 1

30 ml. each of seed culture medium (pH 7.0) consisting of soluble starch (5.0%), glycerin (0.5%), soybean meal (1.0%), meat extract (0.5%), ferrous sulfate (0.01%), magnesium sulfate (0.1%), calcium carbonate (0.5%), "Actocol" (trade name of polyoxypropylene triol of OH number 56, sold by Takeda Chemical Industries, Ltd., Japan) as the deforming agent (0.05%) and water was sterilized in 200 ml.-conical flasks, and was inoculated with a loopful of *Micromonospora chalcea* var. *izumensis* (ATCC 21561) from an agar slant culture. The inoculated culture was shaken on a rotary shaker at 37° C. for 40 hours. The respective seeds were transferred into 500 ml. of the sterilized seed culture medium of the same composition as above in 2 l.-Sakaguchi flasks, and cultivation was continued on a reciprocal shaker at 28° C. for 40 hours.

The seed culture in an amount of 1.5 l. was transferred to a 50 l.-stainless steel tank containing 30 l. of a sterilized main culture medium (pH 7.0) consisting of soluble starch (5.0%), cornsteep liquor (3.0%), meat extract (0.5%), ferrous sulfate (0.01%), magnesium sulfate (0.1%), calcium carbonate (1%), "Actocol" (see above) (0.05%) and water, and the whole was incubated at 28° C. under aeration of 30 l. per minute and agitation of 280 r.p.m. for 114 hours. The proceeding of the fermentation is as follows:

| Incubation time (hours) | pH of broth | Potency [1] (gammas/ml.) |
| --- | --- | --- |
| 0 | 7.20 | |
| 18 | 7.50 | |
| 30 | 6.70 | 0 |
| 42 | 7.30 | 0 |
| 54 | 7.65 | 5.0 |
| 66 | 7.50 | 13.5 |
| 78 | 7.55 | 18.0 |
| 90 | 7.95 | 21.0 |
| 102 | 8.33 | 27.0 |
| 114 | 8.25 | 25.0 |

[1] Remarks: Tested according to Paper-disc method with *Azotobacter vinelandii* as test organism.

Thus obtained culture broth (23.5 l.) was filtered with 750 g. of diatomaceous earth as the filter aid. The filtrate was adjusted to pH 9.0 with a 2 normal aqueous sodium hydroxide solution, followed by the addition of 2 kg. of sodium sulfate. After dissolution of the sodium sulfate, the filtrate was extracted twice with 11 l. each of ethyl acetate. The solvent layer was washed with water, dehydrated and concentrated in vacuo to about 1 l. The concentrate was shaken with 3 l. of a diluted hydrochloric acid (pH about 3 to 4) to transfer the effective ingredients into the aqueous layer. The aqueous layer was separated, again adjusted to pH 9 and extracted twice with 1 l. each of ethyl acetate. As to the extracts thus obtained, said transfer with acid and extraction with ethyl acetate were repeated. The final ethyl acetate extract was washed with water and concentrated in vacuo to leave 450 mg. of a crude powder. The powder was dissolved in 10 ml. of ethanol, and subjected to column chromatography on 150 ml. of "Sephadex LH-20" (see above) to give 165 mg. of Juvenimicin A.

EXAMPLE 2

A seed was prepared in a 2 l.-Sakaguchi flask in the same manner as in Example 1, and was inoculated into 30 l. of a sterilized seed culture medium of the same composition in a 50 l.-stainless steel tank. Cultivation was effected at 28° C. under aeration and agitation for 48 hours as described in Example 1. The culture broth was used as the seed culture.

The seed culture was transferred into 100 l. of a sterilized main culture medium (pH 7.0) consisting of soluble starch (5.0%), cornsteep liquor (3.0%), meat extract (0.5%), ferrous sulfate (0.05%), magnesium sulfate (0.1%), calcium carbonate (0.5%), "Actocol" (see above) (0.05%) and water, in a 200 l.-stainless steel tank. The fermentation was conducted at 28° C. under aeration of 100 l. per minute and agitation of 150 r.p.m. for 90 hours. The proceeding was as follows:

| Incubation time (hours) | pH of broth | Potency (gammas per ml.) |
| --- | --- | --- |
| 0 | 7.05 |  |
| 18 | 7.05 |  |
| 30 | 7.10 | 20.0 |
| 42 | 6.60 | 40.0 |
| 54 | 7.28 | 70.0 |
| 66 | 7.30 | 95.0 |
| 78 | 7.55 | 100.0 |
| 90 | 7.90 | 100.0 |

Thus obtained culture broth (58 l.) was filtered with 1.5 kg. of diatomaceous earth as the filter aid. The filtrate was adjusted to pH 9, and treated in the same manner as in Example 1, i.e. using ethyl acetate and a diluted hydrochloric acid, whereupon 4.5 g. of crude powder was obtained.

The powder was purified with 300 ml. of "Sephadex LH-20" (see above) to obtain 2.9 g. of powdery Juvenimicin A.

EXAMPLE 3

In 20 ml. of ethyl acetate was dissolved 1.8 g. of Juvenimicin A obtained by the procedure in Example 1, and the solution was subjected to thin layer chromatography on silica gel (Merck, HF 254) (40 cm. x 40 cm.) using a mixture of chloroform, methanol and 7% aqueous ammonia (40:12:20 by volume) as the developer. The silica gel in the neighbourhood of $R_f$ about 0.7 was collected and extracted with ethyl acetate. The extract was washed with water, dehydrated and concentrated in vacuo to leave 650 mg. of Juvenimicin $A_3$.

EXAMPLE 4

45 l. of a culture broth obtained by the same procedure as in Example 2 was adjusted to pH 9 and extracted twice with 25 l. each of ethyl acetate. The extracts were combined and treated in the same manner as in Example 1 to obtain 4.0 g. of a crude powder.

The powder was chromatographed on silica gel using the same developer as described in Example 3, to obtain 1.4 g. of Juvenimicin $A_3$.

EXAMPLE 5

The same procedures as in Example 1 were conducted except for using 30 l. of a sterilized main culture medium (pH 7) consisting of soluble starch (5.0%), cornsteep liquor (1%), cotton seed meal (1%), meat extract (0.5%), peptone (0.5%), ferrous sulfate (0.05%), magnesium sulfate (0.1%), calcium carbonate (1%), "Actocol" (see above) (0.05%), and water. In this case, the proceeding of the fermentation was as follows:

| Incubation time (hours) | pH of broth | Potency (gammas/ml.) |
| --- | --- | --- |
| 0 | 7.10 |  |
| 18 | 7.25 |  |
| 30 | 7.50 | 0 |
| 42 | 6.85 | 0 |
| 54 | 7.00 | 0 |
| 66 | 7.12 | 5 |
| 78 | 7.23 | 8.5 |
| 90 | 7.30 | 17.5 |
| 102 | 7.00 | 18.5 |
| 114 | 7.00 | 29 |

The culture broths obtained on several batches were combined, and 100 l. of the combined broth was filtered. The filtrate was adjusted to pH 8.5 and extracted with a half volume of ethyl acetate. The extract was washed with water and extracted twice with a half volume each of a diluted hydrochloric acid of pH 3. The aqueous layer was adjusted to pH 8.5 with a 2 normal aqueous sodium hydroxide solution, and then extracted twice with a half volume each of ethyl acetate. The extract was washed with water, dehydrated and concentracted in vacuo. The concentrate was dissolved in 40 ml. of ethanol and the solution was subjected to column chromatography on 600 ml. of "Sephadex LH-20" (see above) to give 450 mg. of powdery Juvenimicin.

100 mg. of the powder was further subjected to column chromatography on 5 g. of alumina (Merck & Co.), followed by elution with:

(a) a mixture of benzene and acetone (4:1 by volume), giving 3 mg. of a mixture of Juvenimicin $A_1$ and Juvenimicin $A_2$;
(b) a mixture of benzene and acetone (4:2 by volume), giving 13 mg. of Juvenimicin $A_3$;
(c) a mixture of benzene and acetone (1:1 by volume), giving 10 mg. of Juvenimicin $B_1$;
(d) acetone, giving 31 mg. of Juvenimicin $B_3$.

EXAMPLE 6

The same procedures are conducted as in Example 1, except for using 1000 l. of a sterilized main culture medium (pH 7.0) consisting of soluble starch (1%), sucrose (4%), "Profilo" (trade name of purified cotton seed meal sold by Traders Protein Division, U.S.A.) (2%), meat extracts (0.5%), peptone (0.5%), ferrous sulfate (0.05%), magnesium sulfate (0.1%), calcium carbonate (1%). "Actocol" (0.05%) and water, and under aeration of 1000 l. per minute. The potency of the culture broth is about 40 mcg./ml. after 90 hours incubation and reaches 80 meg./ml. after 114 hour incubation.

1,100 l. in total of thus obtained culture broth was adjusted to pH 8.5, and extracted 550 l. of ethyl acetate. The solvent layer was separated, washed with water, dehydrated and concentrated in vacuo to about 30 l. To the concentrate was added 30 l. of a diluted hydrochloric acid of pH 3, and after agitation the aqueous layer was separated. The aqueous layer was adjusted to pH 8.5 and extracted twice with 15 l. each of ethyl acetate. The extracts were combined, washed with water, dehydrated and concentrated in vacuo to leave 15 g. of crude powdery Juvenimicin.

The crude powder was dissolved in 3 l. of ethyl acetate, and the solution was extracted three times with 1 l. each of a 1/15 mole phosphate buffer solution (pH 6.2).

The ethyl acetate layer was then washed with water, dehydrated and concentrated in vacuo. The concentrate was subjected to thin layer chromatography on silica gel (Merck & Co., particle size less than 0.08 mm.), followed by developing with a mixture of chloroform, methanol and a 7% aqueous ammonia solution (40:17:20 by volume)

to separate respective components. Each component was detected under ultraviolet lamp and extracted with ethyl acetate, to give 0.8 g. of Juvenimicin $A_3$, 1.0 g. of Juvenimicin $B_1$ and 0.2 g. of Juvenimicin $B_3$.

On the other hand, the above obtained phosphate buffer extracts were combined, adjusted to pH 9, and extracted three times with one third volume each of ethyl acetate. The ethyl acetate layers were combined, washed with water, dehydrated and concentrated in vacuo. The concentrate was subjected to thin layer chromatography on silica gel in the same manner as described above, whereupon further 0.5 g. of Juvenimicin $B_3$ was obtained.

What is claimed is:

1. Juvenimicin A, characterized by the following properties:
    (1) Elementary analysis:
        C: 63.39±1.0; H: 8.83±0.5; N: 2.80±0.5
    (2) Specific rotation:
        $[\alpha]_D^{24} = -13.4° \pm 10°$ (c.=0.5% in $CHCl_3$)
    (3) Molecular weight:
        (a) Vapour pressure osmosis method: 655±70 (in $C_6H_6$)
        (b) Highest mass number: m/e=581
    (4) Color reaction:
        (a) Erythromycin test: negative
        (b) Carbomycin test: negative
        (c) Dragendorff reaction: positive
    (5) Solubilities:
        Soluble in benzene, chloroform, ethyl acetate, dimethylformamide, ethanol or an aqueous acid solution;
        Insoluble in petroleum ether, n-hexane or a neutral water
    (6) Ultraviolet absorption:
        $\lambda_{max.}^{EtOH} = 240 \pm 2$ m$\mu$ ($E_{1\,cm.}^{1\%} = 230 \pm 30$)
    (7) Infrared absorption:
        The main absorption bands in wave number (cm.$^{-1}$) in KBr disc are as follows: 3450, 2960, 1725, 1695, 1625, 1458, 1383, 1314, 1276, 1250, 1180, 1167, 1111, 1072, 1047, 1027, 983, 966, 932, 896, 869, 846, 834, 792, 755, 713.

2. Juvenimicin $A_3$, characterized by the following properties:
    (1) Elementary analysis:
        C: 62.97±1.0; H: 8.62±0.5; N: 3.00±0.5
    (2) Specific rotation:
        $[\alpha]_D^{24} = -17.6° \pm 10°$ (c.=0.29% in $CHCl_3$)
    (3) Molecular weight:
        (a) Vapour pressure osmosis method: 541±60 (in $C_6H_6$)
        (b) Titration method: 562±60
        (c) Highest mass number: m/e=581
    (4) $pK_{a'}$:
        8.4 (in 66% dimethylformamide)
    (5) Color reaction:
        (a) Erythromycin test: negative
        (b) Carbomycin test: negative
        (c) Dragendorff reaction: positive
    (6) Solubilities:
        Soluble in benzene, chloroform, ethyl acetate, dimethylformamide, ethanol or an aqueous acid solution;
        Insoluble in petroleum ether, n-hexane or a neutral water
    (7) $R_f$-values on thin layer chromatography on silica gel:
        Eluted with mixture of chloroform, methanol and 7% aqueous ammonia solution (40:12:20): $R_f$=0.7±0.05
    (8) Ultraviolet absorption:
        $\lambda_{max.}^{EtOH} = 240 \pm 2$ m$\mu$ ($E_{1\,cm.}^{1\%} = 230 \pm 30$)
    (9) Infrared absorption spectrum:
        The main absorption bands in wave number (cm.$^{-1}$) in KBr disc are as follows: 3450, 2960, 1725, 1695, 1625, 1458, 1383, 1314, 1276, 1250, 1180, 1167, 1111, 1072, 1047, 1027, 983, 966, 932, 896, 869, 846, 834, 792, 755, 713.

3. Juvenimicin $B_1$, characterized by the following properties:
    (1) Elementary analysis:
        C: 64.0±1.0; H: 9.4±0.5; N: 2.5±0.5
    (2) Specific rotation:
        $[\alpha]_D^{23} = -3.0° \pm 5°$ (c.=0.5% in methanol)
        $[\alpha]_D^{23} = +7.6° \pm 5°$ (c.=0.5% in $CHCl_3$)
    (3) Mass spectrometry:
        Highest mass number: m/e=567
    (4) Color reaction:
        (a) Erythromycin test: negative
        (b) Carbomycin test: negative
        (c) Dragendorff reaction: positive
    (5) Solubilities:
        Soluble in benzene, chloroform, ethyl acetate, dimethylformamide, ethanol or an aqueous acid solution;
        Insoluble in petroleum ether, n-hexane or a neutral water
    (6) Ultraviolet absorption:
        $\lambda_{max.}^{EtOH} = 283 \pm 2$ m$\mu$ ($E_{1\,cm.}^{1\%} = 326 \pm 30$)
    (7) Infrared absorption spectrum:
        The main absorption bands in wave number (cm.$^{-1}$) in KBr disc are as follows: 3450, 2940, 1715, 1670, 1595, 1455, 1380, 1312, 1272, 1175, 1110, 1065, 1050, 1024, 985, 928, 905, 889, 843, 805

4. Juvenimicin $B_3$, characterized by the following properties:
    (1) Elementary analysis:
        C: 64.7±1.0; H: 10.2±0.5; N: 3.6±0.5
    (2) Specific rotation:
        $[\alpha]_D^{23} = -9.0° \pm 5°$ (c.=0.5% in methanol)
        $[\alpha]_D^{23} = +5.6° \pm 5°$ (c.=0.5% in $CHCl_3$)
    (3) Mass spectrometry:
        Highest mass number: m/e=583
    (4) Color reaction:
        (a) Erythromycin test: negative
        (b) Carbomycin test: negative
        (c) Dragendorff reaction: positive
    (5) Solubilities:
        Soluble in benzene, chloroform, ethyl acetate, dimethylformamide, ethanol or an aqueous acid solution;
        Insoluble in petroleum ether, n-hexane or a neutral water
    (6) Ultraviolet absorption:
        $\lambda_{max}^{EtOH}$ 283±2 m$\mu$ ($E_{1\,cm.}^{1\%} = 248 \pm 25$)
    (7) Infrared absorption spectrum:
        The main absorption bands in wave number (cm.$^{-1}$) in KBr disc are as follows: 3450, 2940, 1720, 1670, 1595, 1455, 1380, 1312, 1275, 1170, 1110, 1070, 1045, 985, 935, 905, 887, 840, 808.

5. A method for producing Juvenimicin which comprises culturing the microorganism *Micromonospora chalcea* var. *izumensis* under aerobic conditions in a culture medium containing an assimilable carbon source and a digestible nitrogen source at a pH between about 5 and 8 and at a temperature between about 20° and 45° C. for 2 to 7 days, thus accumulating a substantial amount of Juvenimicin in the culture medium, and recovering the Juvenimicin therefrom.

References Cited

Derwent #156945-BD, Abstracting, DT 2034245-Q, published Feb. 25, 1971.

JEROME D. GOLDBERG, Primary Examiner

U.S. Cl. X.R.

195—80

Notice of Adverse Decision in Interference

In Interference No. 99,203, involving Patent No. 3,767,793, M. Shibata, K. Hatano, E. Higashide, H. Yamana and T. Kishi, JUVENIMICIN AND PRODUCTION THEREOF, final judgment adverse to the patentees was rendered Apr. 29, 1977, as to claim 2.

[*Official Gazette August 2, 1977.*]